(12) United States Patent
Huang et al.

(10) Patent No.: US 10,019,307 B2
(45) Date of Patent: *Jul. 10, 2018

(54) ADJUSTING AN OPERATION OF A COMPUTER USING GENERATED CORRECT DEPENDENCY METADATA

(71) Applicant: International Business Machines Corporation, Armonk, NY (US)

(72) Inventors: Gang Huang, Beijing (CN); Tan Jiang, Beijing (CN); Ling Lan, Beijing (CN); Yong Yao, Beijing (CN); Li Yi, Beijing (CN); Liang Wang, Beijing (CN); Yu Zhang, Beijing (CN)

(73) Assignee: International Business Machines Coporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/227,046

(22) Filed: Aug. 3, 2016

(65) Prior Publication Data
US 2016/0342506 A1 Nov. 24, 2016

Related U.S. Application Data

(63) Continuation of application No. 14/483,699, filed on Sep. 11, 2014, now Pat. No. 9,448,873.

(30) Foreign Application Priority Data

Sep. 29, 2013 (CN) .......................... 2013 1 0454548

(51) Int. Cl.
*G06F 11/07* (2006.01)
*G06F 9/50* (2006.01)
(Continued)

(52) U.S. Cl.
CPC .......... *G06F 11/079* (2013.01); *G06F 9/5072* (2013.01); *G06F 11/0709* (2013.01);
(Continued)

(58) Field of Classification Search
CPC ........................... G06F 11/0775; G06F 11/079
See application file for complete search history.

(56) References Cited

U.S. PATENT DOCUMENTS 7,120,559 B1   10/2006   Williams
7,689,872 B2    3/2010   Doyle
(Continued)

FOREIGN PATENT DOCUMENTS

CN          102984214          3/2013

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Joseph R Kudirka
(74) *Attorney, Agent, or Firm* — Law Office of Jim Boice

(57) ABSTRACT

One or more processors acquire dependency metadata, where the dependency metadata is used for representing dependency on data among at least two components of an application. The processor(s) acquire error information and data output, where the error information is used for describing errors that occur while running the application, and where the data output includes data output by the at least two components while running the application. The processor(s) analyze, based on the error information, dependency metadata and data output relevant to the error information, where the analyzing includes determining, based on a null pointer exception in the error information and data output of a component corresponding to the null pointer exception, that
(Continued)

there is an error in dependency metadata corresponding to the null pointer exception. The processor(s) then provide an analysis result to improve the operation of a computer that is running the application.

20 Claims, 6 Drawing Sheets

(51) Int. Cl.
  *H04L 29/08* (2006.01)
  *H04W 4/00* (2018.01)
(52) U.S. Cl.
  CPC .......... *G06F 11/0793* (2013.01); *H04L 67/10* (2013.01); *H04W 4/003* (2013.01)

(56) References Cited

U.S. PATENT DOCUMENTS

| | | |
|---|---|---|
| 7,996,719 B2 | 8/2011 | Bernabeu-Auban et al. |
| 8,103,906 B1 | 1/2012 | Massoud et al. |
| 9,122,602 B1 | 9/2015 | Jewell |
| 2006/0010337 A1 | 1/2006 | Suzuki |
| 2008/0065928 A1 | 3/2008 | Suzuki |
| 2011/0083123 A1 | 4/2011 | Lou |
| 2011/0276951 A1 | 11/2011 | Jain |
| 2012/0324069 A1 | 12/2012 | Nori et al. |
| 2013/0030761 A1 | 1/2013 | Choudur et al. |
| 2013/0111277 A1 | 5/2013 | Oliver et al. |
| 2014/0281739 A1 | 9/2014 | Tuffs |

OTHER PUBLICATIONS

Hiep Nguyen et al. "PAL: Propagation-aware Anomaly Localization for Cloud Hosted Distributed Applications", ACM, SLAML, Oct. 23, 2011, pp. 1-8.

Hui Kang et al. "DAPA: Diagnosing Application Performance Anomalies for Virtualized Infrastructures", USENIX Association, 2nd USENIX Workshop on Hot Topics in Management of Internet, Cloud, and Enterprise Networks and Services, Apr. 24, 2012, San Jose, CA, pp. 1-6.

Anonymous, "A Comparative Analytical Approach for Application Diagnoses in a Cloud", IP.com, IPCOM000219405D, Jun. 27, 2012, pp. 1-2.

J. M. Silva et al., "Ditto—Deterministic Execution Replayability-as-a-Service for Java VM on Multiprocessors", in Middleware 2013, pp. 405-424, 2013.

U.S. Appl. No. 14/483,699—Non-Final Office Action dated Apr. 19, 2016.

ADJUSTING AN OPERATION OF A COMPUTER USING GENERATED CORRECT DEPENDENCY METADATA

BACKGROUND

The present invention relates to field of information processing, more specifically, to a data processing method and apparatus.

With continuous development in application development technology, more and more applications do not employ the approach of integrated development any longer, rather, they are separated into a plurality of components for development. There is data dependency and order constraints among the plurality of components constituting an application.

The plurality of components constituting an application may be developed by different developers, or there may be a component that can be reused in the plurality of components, that is, there may be a common component. All these may cause error in data dependency and order constraints, thereby making the entire application unable to run.

If an error is reported in running an application, whether for a developer or a user of the application, it is hard to determine the reason leading to the error, and a tremendous effort will be needed to correct the error. Therefore, there is a need for a simple and easy solution to prompt for a reason leading to an error or prompt for an error correction method.

SUMMARY

In accordance with one or more embodiments of the present invention, a processor-implemented method, computer system, and/or computer program product analyzes data processing. One or more processors acquire dependency metadata, where the dependency metadata is used for representing dependency on data among at least two components of an application. The processor(s) acquire error information and data output, where the error information is used for describing errors that occur while running the application, and where the data output includes data output by the at least two components while running the application. The processor(s) analyze, based on the error information, dependency metadata and data output relevant to the error information, where the analyzing includes determining, based on a null pointer exception in the error information and data output of a component corresponding to the null pointer exception, that there is an error in dependency metadata corresponding to the null pointer exception. The processor(s) provide an analysis result, where the analysis result includes at least one of: a reason why an error occurs, a prompt for an error correction method, a relevant dependency metadata leading to an occurrence of an error, and relevant data output leading to an occurrence of an error. The processor(s) adjust an operation of a computer that is executing the application based on the analysis result.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
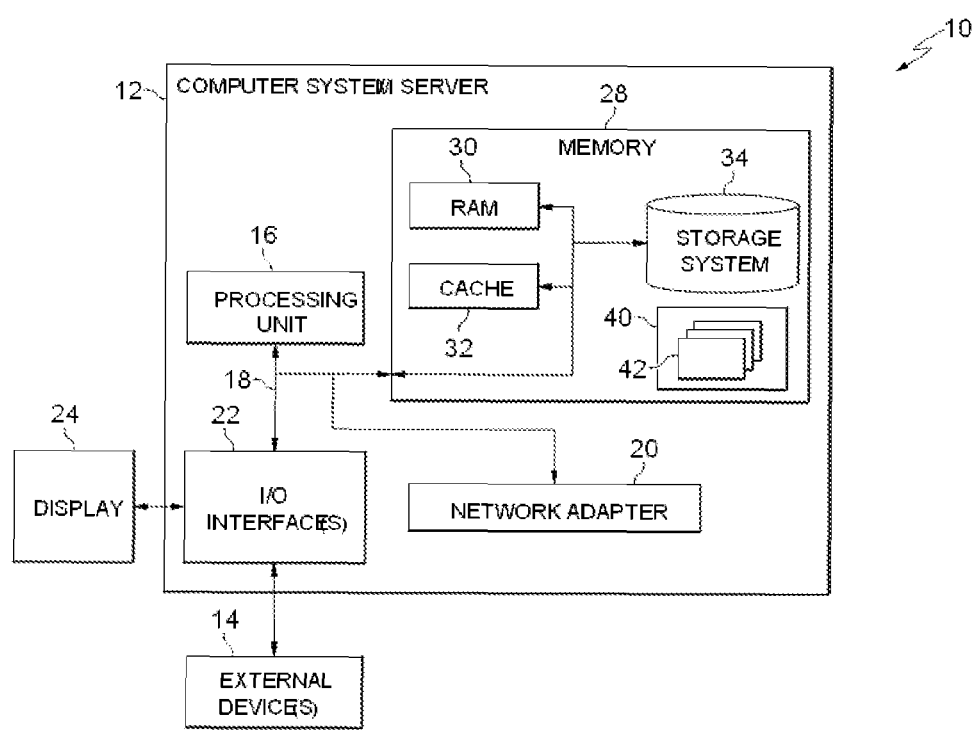
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
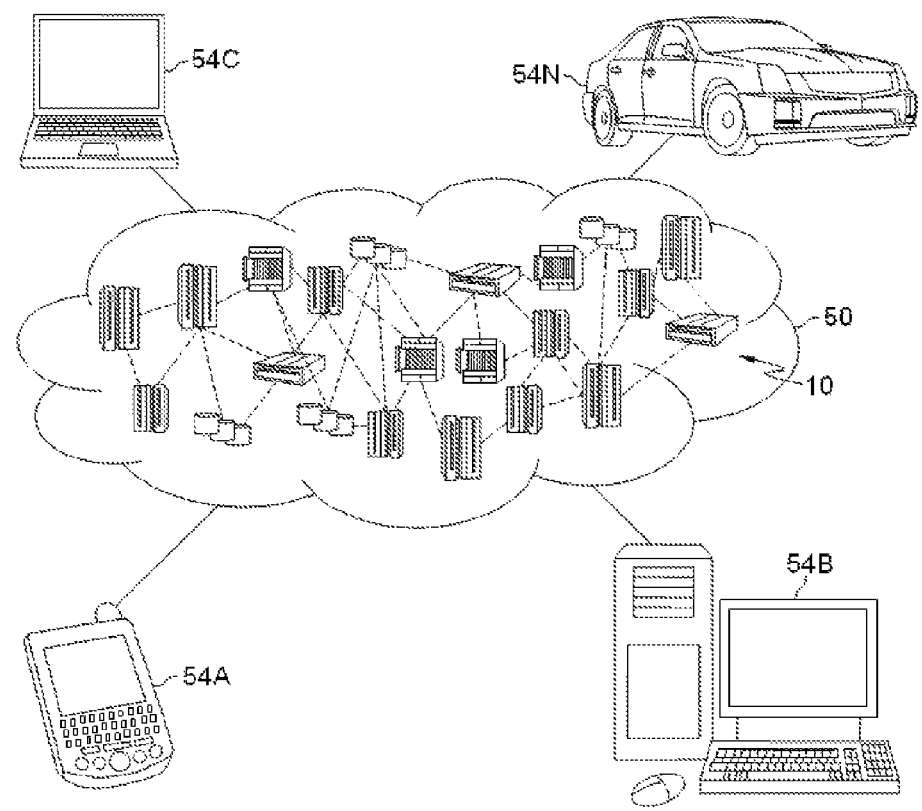
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
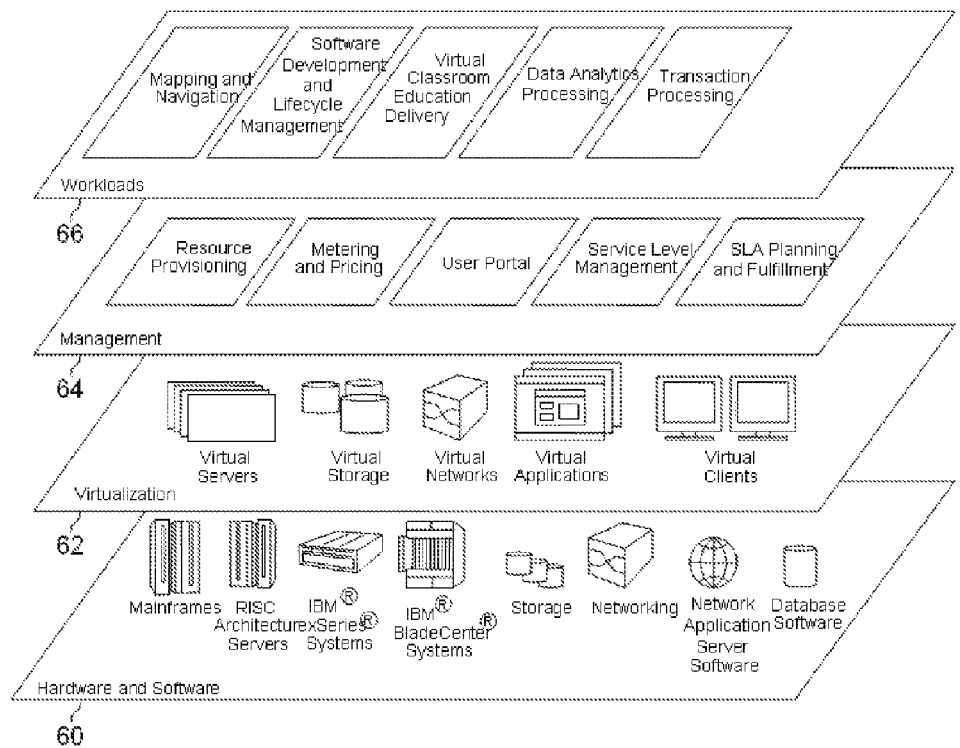
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing.

Figure 4:
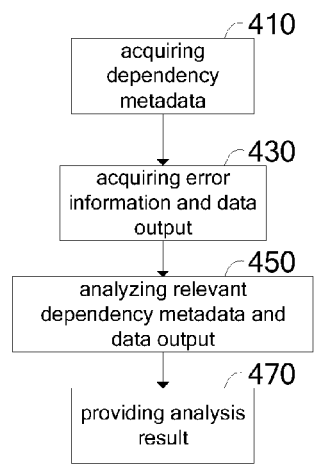
FIG. 4 depicts a flowchart of a data processing method according to an embodiment of the present invention.

With reference now to FIG. 4, an embodiment of the invention provides a data processing method. The method comprises: step 410, acquiring dependency metadata; step 430, acquiring error information and data output; step 450, analyzing, based on the error information, dependency metadata and data output relevant to that error information; step 470, providing analysis result. In the present embodiment, the dependency metadata is used for representing dependency on data among at least two components; the error information is used for describing errors that occur in running an application including the at least two components, the data output includes data output by components in running the application; the analysis result includes at least one of: a reason why an error occurs, a prompt for an error correction method, a relevant dependency metadata leading to occurrence of an error and relevant data output leading to occurrence of an error. Those skilled in the art can appreciate that data output may include, for example, at least one of a name of output attribute and a value of that attribute. The present embodiment is applicable to an application including a plurality of components, wherein the application may be comprised of the plurality of components or may also include other parts. The application may be a service, a middleware or an application having specific functions etc., and the invention has no limitation thereto. By using the technical solution provided in the present embodiment, supplemental information capable of helping a user to correct errors can be provided based on error information, data output and dependency metadata. For example, the recorded error information includes: an attribute of component B with name (or id, names in the following embodiments may all be referred to as id) xx1 has read but does not get any data, i.e., null pointer exception. According to dependency metadata, the source of xx1 should be an attribute of component A with name yy1. Based on the recorded data output of component A, it is found that the attribute with name yy1 has no output. At this point, a reason why an error occurs can be provided to user: because the attribute of component A with name yy1 has no output, this leads to the attribute of component B with name xx1 being unable to acquire the required input. In this way, the user can easily acquire the reason why an error occurs, so as to conduct correction on component B. Moreover, by utilizing the method provided in the present embodiment, errors that could not be found in a design can also be found. Still taking the above illustration for example, if an attribute of component A with name yy1 will have output only when it is running, then this error is undiscoverable in the design phase or in a non-operational state, so that this error cannot be corrected. However, by recording error information and data output generated while running the application, the solution provided in the present embodiment not only can find errors that already existed in the design phase, but also can find errors that are only presented in the running state, thereby helping the user to correct various existing errors.

In an embodiment of the invention, the error information includes, for example, null pointer exception that occurred in reading data.

In an embodiment of the invention, step 450 comprises, for example, at least one of: determining, based on a null pointer exception in the error information and dependency metadata corresponding to that null pointer exception, that corresponding data has not been output by a component corresponding to that null pointer exception; determining, based on a null pointer exception in the error information and data output of a component corresponding to that null pointer exception, that there is an error in dependency metadata corresponding to that null pointer exception; determining, based on a null pointer exception in the error information and data output of a component corresponding to that null pointer exception, correct dependency metadata corresponding to that null pointer exception. Wherein, the step of determining, based on a null pointer exception in the error information and data output of a component corresponding to that null pointer exception, correct dependency metadata corresponding to that null pointer exception may for example repair erroneous dependency metadata, and automatically modify the erroneous dependency metadata as correct dependency metadata.

Figure 5:
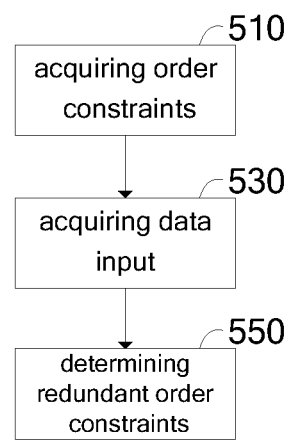
FIG. 5 depicts a flowchart of a data processing method according to an embodiment of the present invention.

Referring to FIG. 5, in an embodiment of the invention, there is provided a data processing method. The method comprises: step 510, acquiring order constraints; step 530, acquiring data input; step 550, determining redundant order constraints existing in the order constraints based on the order constraints and the data input. In the present embodiment, the order constraints are used for representing execution order of the at least two components; the data input includes data read by components in running the application. Wherein, the data input includes, in particular, data output by other components and read by components in running the application. Those skilled in the art can appreciate that, the read data may include, for example, at least one of name of an attribute of data that needs to be read and a value read by that attribute. With the technical solution provided by the embodiment, existing redundant order constraints may be determined to help the user to adjust or delete order constraints. For example, user has set an order constraint between components C and D, specifically, component D needs to be executed after component C is executed. Through a record of data input in running state in the present embodiment, it is found that component D does not have any data input that is data output of reading component C, thus it can be determined that this order constraint is a redundant order constraint. In this way, the user may delete or adjust redundant order constraints. In another embodiment, the method shown in FIG. 5 may further comprise a step of prompting for the user, i.e., prompting the redundant order constraint for the user. Further, the user may be provided with different prompts based on whether redundant order constraints are defined in dependency metadata or defined by a user when building an application.

The embodiment shown in FIG. 4 may be combined with the embodiment shown in FIG. 5. In a combined example, there is no specific order among steps 410-470 and steps 510-550.

In another combined example, data input obtained in step 530 may be achieved at the same time as data output obtained in step 430, that is, error information and data input and data output of components are recorded while running the application. In still another combined example, the step of prompting redundant order constraints to the user in the embodiment shown in FIG. 5 may be realized at the same time as step 470, that is, error information and redundant order constraints are prompted to the user at the same time.

In an embodiment of the invention, step 510 may comprise: acquiring order constraints by analyzing the acquired dependency metadata, for example. The embodiment shown in FIG. 5 may further comprise: prompting to the user existing redundant order constraints and dependency metadata leading to the redundant order constraints. Since the redundant order constraints are defined in dependency metadata, by prompting redundant order constraints and relevant dependency metadata to the user, it may help the user to adjust or delete the redundant order constraints.

In an embodiment of the invention, step 510 may comprise: acquiring order constraints by parsing a profile of an application instance, for example. Specifically, step 510 may comprise: acquiring the profile of an application instance from a cloud platform; acquiring order constraints by parsing the profile, for example. When building an application, the user may define order constraints among a plurality of components which are contained in a profile of an application instance. Thus, order constraints may be obtained by parsing an application instance obtained from a cloud platform. Those skilled in the art can appreciate that, by combining with other embodiments, the step of acquiring the profile of an application instance from a cloud platform can be accomplished in other steps, such as, the step of acquiring the profile of an application instance from a cloud platform is performed in the step of acquiring dependency metadata, in this way, step 510 only needs to parse the acquired profile of the application instance to acquire order constraints.

As mentioned above, the invention can either be applied to a cloud computing environment or to other computing environment. Next, description will be made by first taking application of an embodiment in a cloud computing environment for example.

In an embodiment of the invention, step 430 comprises: acquiring from a cloud platform error information and data output recorded by the cloud platform, for example. In the embodiment, the error information is used for describing errors that occurred in running the application on the cloud platform, the data output includes data output by components in running the application on the cloud platform. By using the technical solution of the embodiment, running of an application may be placed at cloud platform side and data output and error information of components are recorded by the cloud platform, this can reduce requirement for computation capability of terminals. Here, steps such as analyzing, etc., are accomplished by terminals, which can reduce workload of the cloud platform and improve performance thereof.

In an embodiment of the invention, step 530 comprises: acquiring from a cloud platform data input recorded by the cloud platform, for example. Wherein, the data input includes data read by components in running the application on the cloud platform. Those skilled in the art can appreciate that, if both steps 530 and 430 are included in an implementation, these two steps may be accomplished together, that is, error information, data output and data input are acquired simultaneously. Accordingly, a cloud platform may also record the error information, data input and data output simultaneously in running an application.

In an embodiment of the invention, step 410 comprises: acquiring a profile of an application instance from a cloud platform; searching a local environment based on the profile to obtain at least part of the dependency metadata, for example. Still further, a profile of an application instance may be acquired by logging into a cloud platform, so as to control acquiring of the application instance by different users, and to facilitate a user to build and find his/her own application instances. By using the method provided in the embodiment, local environment may be searched first to obtain dependency metadata, which can reduce communication between terminals and the cloud platform and reduce transmission pressure on network. In another embodiment of the invention, the dependency metadata is acquired from the cloud platform if the dependency metadata could not be found in local environment. In specific implementation, required dependency metadata may be acquired by invoking an API of the cloud platform.

Those skilled in the art can appreciate that, when embodiments of the invention are implemented in a cloud computing environment, running an application in a cloud platform may be achieved by deploying the application in a virtual machine.

Figure 6:
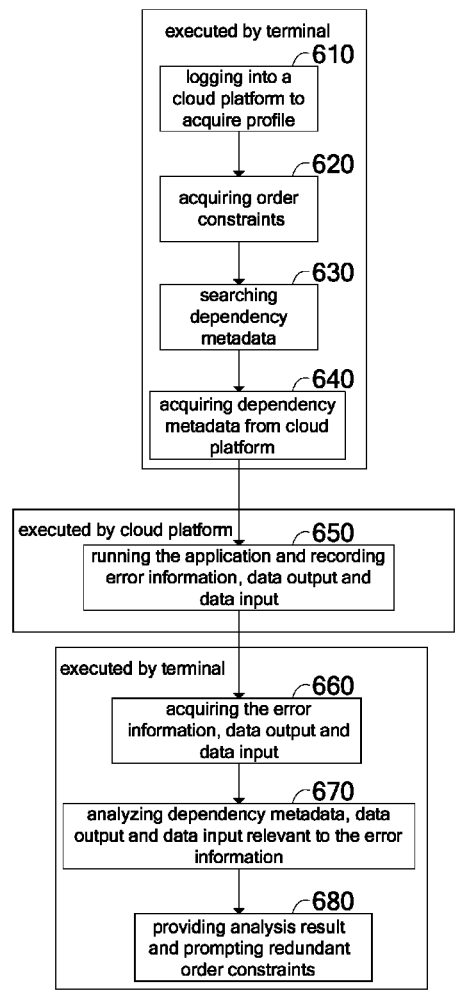
FIG. 6 depicts a flowchart of an example implemented by a data processing method according to an embodiment of the present invention.

Next, application of an embodiment of the invention in cloud computing environment will be described by taking the illustration shown in FIG. 6 for example.

In step 610, logging into a cloud platform to acquire a profile of an application instance A. The application instance A includes 4 components, that is, component W, component X, component Y and component Z.

In step 620, parsing the profile of the application instance A to acquire order constraints. By parsing the profile of the application instance A, user defined order constraints are acquired, that is, component Z will be executed after component Y has been executed.

In step 630, searching dependency metadata in a local environment based on the profile of the application instance A.

In step 640, invoking an API of the cloud platform to acquire dependency metadata in response to no dependency metadata being found in the local environment. Wherein, following dependency metadata is acquired:

```
{
    "source" : "W" ,
    "target" : "X" ,
    "attributeMapping" : [
        {
            "sourceid" : "host",
            "targetid" : "dmgrhost"
        },
        {
            "sourceid" : "port" ,
            "targetid" : "dmgrport"
        }
    ]
}
{
"source" : "W" ,
"target" : "Y" ,
```

-continued

```
"attributeMapping" : [
        {
            "sourceid" : "dbctx" ,
            "targetid" : "dbctx"
        }
    ]
}
{
"source" : "Y" ,
"target" : "Z" ,
"attributeMapping" : [
        {
            "sourceid" : "jmxport" ,
            "targetid" : "jmxport"
        }
    ]
}
```

In step 650, running the application instance A and recording error information, data output and data input by the cloud platform. Referring to table 1, which is the recorded error information, data input and data output.

TABLE 1

Recorded table of error information, data input and data output

| Source | | Target | |
|---|---|---|---|
| W.host | cell.cc.c | X.host | cell.cc.c |
| W. mgmtport | 8879 | X.dmgrport | null pointer exception |
| W.dbctx | No export | Y.dbctx | null pointer exception |
| Y.jmxport | 8800 | Z.jmxport | no data reading |

In step 660, acquiring the error information, data output and data input from the cloud platform. Terminals need to acquire corresponding information from the cloud platform.

In step 670, analyzing, based on the error information, dependency metadata, data output and data input relevant to the error information. In this example, with respect to null pointer exception of X.dmgrport and dependency metadata "sourceid": "port", "targetid": "dmgrport" of component W and component X, it may be determined that component W does not have an attribute with name 'port' that has data output, thus X.dmgrport has not read the required data. That is, the dependency metadata is determined to be erroneous. Further, there is an attribute with name 'mgmtport' in component W, which has data output 8879 and that data output has not been read, it can thus be determined that correct dependency metadata are "sourceid": "mgmtport", "targetid": "dmgrport". In this example, with respect to null pointer exception of Y.dbctx and dependency metadata "sourceid": "dbctx", "targetid": "dbctx" of component W and component Y, it can be determined that dbctx of component W has no data output. In this example, component Z has not read data output of component Y, it can thus be determined that component Z does not have to be executed after component Y has been executed.

In step 680, providing an analysis result and prompting redundant order constraints. In this example, the analysis result may include a reason why an error occurs, such as "component W has no output with name 'port', thus 'dmgrport' in component X can not read the required data". In this example, the analysis result may include a prompt for an error correction method, such as "dependency metadata should be modified as sourceid:mgmtport, targetid:dmgrport". Those skilled in the art can appreciate that, according to this example, if there are two attributes in component W which have data output but the data output has not been read and there are also two attributes in component X which have not read the required data, then the analysis result may include relevant data output leading to occurrence of an error and/or relevant dependency metadata leading to occurrence of an error, for example, to prompt a name of an attribute from which component X has not read the required data and prompt that there is no data output that has been read in data output of component W, and also to prompt erroneous dependency metadata. In this example, an order constraint may be acquired by analyzing dependency metadata, i.e. "component Z will be executed after component Y has been executed". It can be found in the above steps that, component Z does not need to be executed after component Y has been executed, thus in step 680, this redundant order constraint may be prompted to the user.

Those skilled in the art can appreciate that, in a cloud computing environment, embodiments of the invention may also be implemented solely on a terminal or on a cloud platform. In an embodiment of the invention, step 430 may comprise: running the application and recording error information for describing errors that occur in running the application and data output by components in running the application, for example. In an embodiment of the invention, step 530 comprises: running the application and recording data read by components in running the application, for example.

Moreover, embodiments of the invention may be implemented in a non-cloud computing environment. Referring to the above description, embodiments of the invention may be implemented on two devices that interact with each other or solely implemented on a single device.

Several probable combinations have been described above through specific examples, those skilled in the art can appreciate that, more embodiments may be obtained through combinations, which will be omitted here for brevity.

Various embodiments for realizing the method of the invention have been described hereinabove with reference to figures. Those skilled in the art can appreciate that, the above method may be realized in software or hardware, or by a combination thereof. Moreover, those skilled in the art can appreciate that, a data processing apparatus may be provided by implementing steps in the above method in software, hardware or a combination thereof. Although the apparatus is identical to a general purpose processing device in hardware structure, due to functions of software contained therein, the apparatus is made to present features different from a general purpose processing device, thereby forming an apparatus of various embodiments of the invention. A data processing apparatus according to various embodiments of the invention will be described below with reference to FIG. 7.

Figure 7:
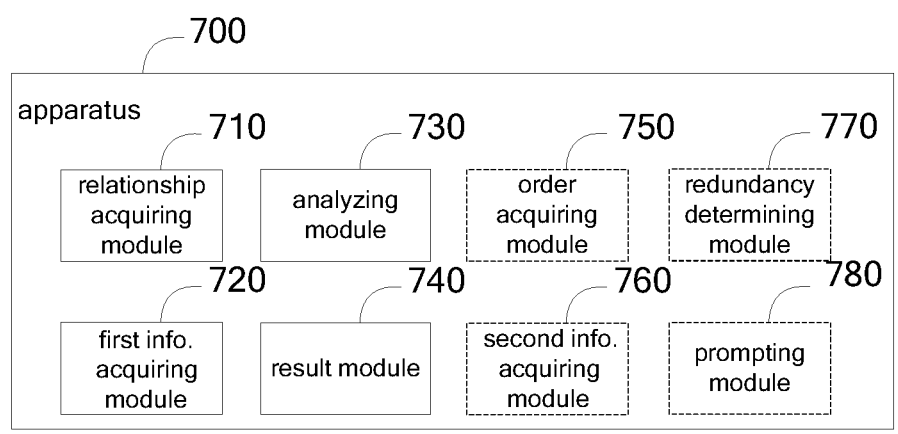
FIG. 7 depicts a structure diagram of a data processing apparatus according to an embodiment of the present invention.

Referring to FIG. 7, a data processing apparatus 700 provided in an embodiment of the invention is shown. The apparatus may be deployed on a terminal, for example. Preferably, the terminal may communicate with a cloud platform and acquire information from the cloud platform. The apparatus may also be deployed on a cloud platform. The apparatus 700 comprises: a relationship acquiring module 710 configured to acquire dependency metadata, wherein the dependency metadata is used for representing dependency on data among at least two components; a first information acquiring module 720 configured to acquire error information and data output, wherein the error information is used for describing errors that occur in running an application, the data output includes data output by components in running the application, the application includes the at least two components; an analyzing module 730 configured to analyze, based on the error information, dependency metadata and data output relevant to that error information; and a result module 740 configured to provide analysis result including at least one of: a reason why an error occurs, a prompt for an error correction method, relevant dependency metadata leading to occurrence of an error and relevant data output leading to an occurrence of an error. With the apparatus provided in this embodiment, supplemental information capable of helping a user to correct errors can be provided based on error information, data output and dependency metadata. This can avoid huge man power consumption required to find an error by the user manually, and can also help the user to locate an error and reason why the error occurs in a faster and more accurate way.

In an embodiment of the invention, the apparatus 700 further comprises: an order acquiring module 750 configured to acquire order constraints, wherein the order constraints are used for representing an execution order of the at least two components; a second information acquiring module 760 configured to acquire data input, wherein the data input includes data read by components in running the application; and a redundancy determining module 770 configured to determine redundant order constraints that exist in the order constraints based on the order constraints and the data input. Those skilled in the art can appreciate that, when this embodiment is implemented by hardware or software, the second information acquiring module 760 and the first information acquiring module 720 may be implemented by a same hardware or software component.

In an embodiment of the invention, the order acquiring module 750 comprises at least one of the following sub-modules (not shown): a first order sub-module configured to acquire order constraints by analyzing the acquired dependency metadata; a second order sub-module configured to acquire order constraints by parsing a profile of an application instance. In another embodiment of the invention, the apparatus 700 further comprises: a prompting module 780 configured to prompt to the user existing redundant order constraints and dependency metadata leading to the redundant order constraints.

In an embodiment of the invention, the first information acquiring module 720 comprises at least one of: a cloud platform acquiring a sub-module configured to acquire from a cloud platform error information and data output recorded by the cloud platform, wherein the error information is used for describing errors that occur while running the application on the cloud platform, the data output includes data output by components in running the application on the cloud platform; a first running and recording sub-module configured to run the application and record error information for describing errors that occur while running the application and data output by components in running the application. In another embodiment of the invention, if the apparatus is deployed on a cloud platform, then the first information acquiring module 720 comprises the first running and recording sub-module.

In an embodiment of the invention, the relationship acquiring module 710 comprises: a profile acquiring sub-module configured to acquire a profile of an application instance from a cloud platform; a searching sub-module configured to search a local environment based on the profile to obtain at least part of the dependency metadata. In another embodiment of the invention, the relationship acquiring module 710 further comprises: a dependency metadata acquiring sub-module configured to acquire the dependency metadata from the cloud platform if the dependency metadata could not be found in the local environment.

In an embodiment of the invention, the analyzing module 730 comprises at least one of: a first determining sub-module configured to determine, based on a null pointer exception in the error information and dependency metadata corresponding to that null pointer exception, that corresponding data has not been output by a component corresponding to that null pointer exception; a second determining sub-module configured to determine, based on a null pointer exception in the error information and data output of a component corresponding to that null pointer exception, that there is an error in dependency metadata corresponding to that null pointer exception; a third determining sub-module configured to determine, based on a null pointer exception in the error information and data output of a component corresponding to that null pointer exception, correct dependency metadata corresponding to that null pointer exception.

In an embodiment of the invention, the second information acquiring module comprises at least one of: a data input acquiring sub-module configured to acquire from a cloud platform data input recorded by the cloud platform, wherein the data input includes data read by components in running the application on the cloud platform; a second running and recording sub-module configured to run the application and record data read by components in running the application.

For implementation details of the above apparatus embodiments, reference may be made to corresponding method embodiments. Moreover, the above apparatus embodiments may be referred to or combined with each other to obtain more implementations, and for detailed combination manner, reference may also be made to the method embodiments and combination hint given therein.

The present invention relates to field of information processing and discloses a data processing method comprising: acquiring dependency metadata, wherein the dependency metadata is used for representing dependency on data among at least two components; acquiring error information and data output, wherein the error information is used for describing errors that occur while running an application, the data output includes data output by components in running the application, the application includes the at least two components; analyzing, based on the error information, dependency metadata and data output relevant to that error information; providing analysis result including at least one of: a reason why an error occurs, a prompt for an error correction method, relevant dependency metadata leading to an occurrence of an error and relevant data output leading to an occurrence of an error. Accordingly, the invention also provides a data processing apparatus. The solution provided in the invention can help user to locate error in a fast and accurate way and correct the error.

In view of the above problems in the art, embodiments of the invention provide a data processing method and apparatus to provide a technical solution to help to correct errors occurred in an application comprised of a plurality of components.

According to one aspect of the present invention, there is provided a data processing method, comprising: acquiring dependency metadata, wherein the dependency metadata is used for representing dependency on data among at least two components; acquiring error information and data output, wherein the error information is used for describing errors that occur while running an application, the data output includes data output by components in running the application, the application includes the at least two components; analyzing, based on the error information, dependency metadata and data output relevant to that error information; providing analysis result including at least one of: a reason why an error occurs, a prompt for an error correction method, relevant dependency metadata leading to an occurrence of an error and relevant data output leading to an occurrence of an error.

According to another aspect of the present invention, there is provided a data processing apparatus, comprising: a relationship acquiring module configured to acquire dependency metadata, wherein the dependency metadata is used for representing dependency on data among at least two components; a first information acquiring module configured to acquire error information and data output, wherein the error information is used for describing errors that occur while running an application, the data output includes data output by components in running the application, the application includes the at least two components; an analyzing module configured to analyze, based on the error information, dependency metadata and data output relevant to that error information; a result module configured to provide analysis result including at least one of: a reason why an error occurs, a prompt for an error correction method, relevant dependency metadata leading to an occurrence of an error and relevant data output leading to an occurrence of an error.

The technical solution provided by the invention can help to correct errors occurred in an application.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method comprising:
   acquiring, by one or more processors, original dependency metadata, wherein the original dependency metadata is used for representing dependency on data among at least two components of an application, wherein the original dependency metadata is created in a cloud platform, wherein the at least two components of the application comprise a first component and a second component, and wherein execution of the second component is dependent upon data that is outputted by the first component;
   searching, by a local computer that is connected to the cloud platform over a network, a memory in the local computer for a copy of the original dependency metadata;
   in response to the local computer locating the copy of the original dependency metadata in the memory in the local computer, retrieving, by one or more processors, the copy of the original dependency metadata from the memory in the local computer, wherein transmission pressure on the network is reduced when retrieving the copy of the original dependency metadata;
   acquiring, by one or more processors, error information and data output, wherein the error information is used for describing errors that occur while running the application, and wherein the data output includes data output of the first component while running the application;

analyzing, by one or more processors and based on the error information, the original dependency metadata and the data output of the first component relevant to the error information, wherein said analyzing comprises determining, based on a null pointer exception in the error information and data output of a component corresponding to the null pointer exception, that there is an error in dependency metadata corresponding to the null pointer exception;

providing, by one or more processors, an analysis result, wherein the analysis result includes at least one of: a reason why the error occurred, a prompt for an error correction method for the error, a relevant dependency metadata leading to an occurrence of the error, and relevant data output leading to the occurrence of the error; and adjusting, by one or more processors, an operation of a computer that is executing the application based on the analysis result.

2. The processor-implemented method of claim 1, further comprising:

acquiring, by one or more processors, order constraints, wherein the order constraints are used for representing execution order of the at least two components;

acquiring, by one or more processors, data input, wherein the data input includes data read by components while running the application; and determining, by one or more processors, redundant order constraints that exist in the order constraints based on the order constraints and the data input.

3. The processor-implemented method of claim 2, wherein said acquiring order constraints comprises:

acquiring, by one or more processors, order constraints by analyzing the acquired original dependency metadata.

4. The processor-implemented method of claim 2, wherein said acquiring order constraints comprises:

acquiring, by one or more processors, order constraints by parsing a profile of an application instance.

5. The processor-implemented method of claim 2, further comprising:

prompting, by one or more processors and to a user, existing redundant order constraints and dependency metadata leading to the redundant order constraints.

6. The processor-implemented method of claim 2, wherein said acquiring data input comprises:

acquiring, by one or more processors, from the cloud platform, data input recorded by the cloud platform, wherein the data input includes data read by components while running the application on the cloud platform; and running, by one or more processors, the application and recording data read by components while running the application.

7. The processor-implemented method of claim 1, wherein said acquiring error information and data output comprises:

acquiring, by one or more processors and from the cloud platform, error information and data output recorded by the cloud platform, wherein the error information describes errors that occurred while running the application on the cloud platform, and wherein the data output includes data output by components while running the application on the cloud platform;

re-running, by one or more processors, the application;

recording, by one or more processors, error information that describes errors that occurred while running the application; and recording, by one or more processors, data output from predetermined components that occur from running the application.

8. The processor-implemented method of claim 1, further comprising:

based on the analysis result, modifying, by one or more processors, the original dependency metadata in order to generate a correct dependency metadata, wherein the correct dependency metadata corrects a dependency of the second component on the first component found in the original dependency metadata that caused the null pointer exception, and wherein modifying the original dependency metadata automatically adds a new data source identifier for data generated by the first component that is required by the second component.

9. The processor-implemented method of claim 1, wherein a terminal acquires the error information from the cloud platform, and wherein the terminal analyzes the original dependency metadata and data output relevant to the error information in order to reduce a workload of the cloud platform.

10. A computer program product comprising one or more computer readable storage media, and program instructions stored on at least one of the one or more computer readable storage media, the stored program instructions comprising:

program instructions to acquire dependency metadata, wherein the dependency metadata is used for representing dependency on data among at least two components of an application, and wherein the dependency metadata is created in a cloud platform;

program instructions to search, by a local computer that is connected to the cloud platform over a network, a memory in the local computer for a copy of the dependency metadata;

program instructions to, in response to the local computer locating the copy of the dependency metadata in the memory in the local computer, retrieve the copy of the dependency metadata from the memory in the local computer, wherein transmission pressure on the network is reduced when retrieving the copy of the dependency metadata;

program instructions to acquire error information and data output, wherein the error information is used for describing errors that occur while running the application, and wherein the data output includes data output by said at least two components while running the application;

program instructions to analyze, based on the error information, dependency metadata and data output relevant to the error information, wherein the program instructions to analyze comprise program instructions to determine, based on a null pointer exception in the error information and data output of a component corresponding to the null pointer exception, that there is an error in dependency metadata corresponding to the null pointer exception;

program instructions to provide an analysis result, wherein the analysis result includes at least one of: a reason why the error occurred, a prompt for an error correction method, a relevant dependency metadata leading to an occurrence of the error, and relevant data output leading to the occurrence of the error; and program instructions to adjust an operation of a computer that is executing the application based on the analysis result.

11. The computer program product of claim 10, further comprising:

program instructions to acquire order constraints, wherein the order constraints are used for representing execution order of the at least two components;
program instructions to acquire data input, wherein the data input includes data read by components while running the application; and
program instructions to determine redundant order constraints that exist in the order constraints based on the order constraints and the data input.

12. The computer program product of claim 11, wherein the program instructions to acquire order constraints comprise:
program instructions to acquire order constraints by analyzing the acquired dependency metadata.

13. The computer program product of claim 11, wherein the program instructions to acquire order constraints comprise:
program instructions to acquire order constraints by parsing a profile of an application instance.

14. The computer program product of claim 11, further comprising:
program instructions to prompt, to a user, existing redundant order constraints and dependency metadata leading to the redundant order constraints.

15. The computer program product of claim 11, wherein said program instructions to acquire data input comprise:
program instructions to acquire, from the cloud platform, data input recorded by the cloud platform, wherein the data input includes data read by components while running the application on the cloud platform; and
program instructions to run the application and record data read by components while running the application.

16. The computer program product of claim 10, wherein said program instructions to acquire error information and data output comprise:
program instructions to acquire, from the cloud platform, error information and data output recorded by the cloud platform, wherein the error information describes errors that occurred while running the application on the cloud platform, and wherein the data output includes data output by components while running the application on the cloud platform;
program instructions to re-run the application;
program instructions to record error information that describes errors that occurred while running the application; and
program instructions to record data output from predetermined components that occur from running the application.

17. A computer system comprising one or more processors, one or more computer readable memories, and one or more computer readable storage media, and program instructions stored on at least one of the one or more computer readable storage media for execution by at least one of the one or more processors via at least one of the one or more computer readable memories, the stored program instructions comprising:
program instructions to acquire dependency metadata, wherein the dependency metadata is used for representing dependency on data among at least two components of an application, and wherein the dependency metadata is created in a cloud platform;
program instructions to search, by a local computer that is connected to the cloud platform over a network, a memory in the local computer for a copy of the dependency metadata;
program instructions to, in response to the local computer locating the copy of the dependency metadata in the memory in the local computer, retrieve the copy of the dependency metadata from the memory in the local computer, wherein transmission pressure on the network is reduced when retrieving the copy of the dependency metadata;
program instructions to acquire error information and data output, wherein the error information is used for describing errors that occur while running the application, and wherein the data output includes data output by said at least two components while running the application;
program instructions to analyze, based on the error information, dependency metadata and data output relevant to the error information, wherein the program instructions to analyze comprise program instructions to determine, based on a null pointer exception in the error information and data output of a component corresponding to the null pointer exception, that there is an error in dependency metadata corresponding to the null pointer exception;
program instructions to provide an analysis result, wherein the analysis result includes at least one of: a reason why the error occurred, a prompt for an error correction method, a relevant dependency metadata leading to an occurrence of the error, and relevant data output leading to the occurrence of the error; and
program instructions to adjust an operation of a computer that is executing the application based on the analysis result.

18. The computer system of claim 17, further comprising:
program instructions to acquire order constraints, wherein the order constraints are used for representing execution order of the at least two components;
program instructions to acquire data input, wherein the data input includes data read by components while running the application; and
program instructions to determine redundant order constraints that exist in the order constraints based on the order constraints and the data input.

19. The computer system of claim 18, wherein the program instructions to acquire order constraints comprise:
program instructions to acquire order constraints by analyzing the acquired dependency metadata.

20. The computer system of claim 18, further comprising:
program instructions to prompt, to a user, existing redundant order constraints and dependency metadata leading to the redundant order constraints.

* * * * *